（12）United States Patent
Schwärzler et al.

(10) Patent No.: US 7,591,730 B2
(45) Date of Patent: Sep. 22, 2009

(54) FIXED BALL JOINT WITH TURNED TRACK CROSS-SECTIONS

(75) Inventors: Peter Schwärzler, Glattbach (DE); Heiko Harnischfeger, Freiensteinau-Weidenau (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 497 days.

(21) Appl. No.: 10/568,670

(22) PCT Filed: Jun. 5, 2004

(86) PCT No.: PCT/EP2004/006090

§ 371 (c)(1),
(2), (4) Date: May 19, 2006

(87) PCT Pub. No.: WO2005/028896

PCT Pub. Date: Mar. 31, 2005

(65) Prior Publication Data

US 2007/0060398 A1   Mar. 15, 2007

(30) Foreign Application Priority Data

Aug. 22, 2003  (DE) ................................. 103 38 716
Apr. 17, 2004  (DE) ....................... 10 2004 018 721

(51) Int. Cl.
  *F16D 3/223*   (2006.01)
(52) U.S. Cl. ....................................... 464/145; 464/906
(58) Field of Classification Search ................. 464/140, 464/145, 906
See application file for complete search history.

(56) References Cited

U.S. PATENT DOCUMENTS

| | | | | |
|---|---|---|---|---|
| 3,475,924 A | * | 11/1969 | Aucktor | 464/145 |
| 4,019,347 A | | 4/1977 | Krude | |
| 4,432,741 A | * | 2/1984 | Winkler | 464/145 |
| 5,221,233 A | * | 6/1993 | Jacob | 464/145 |

(Continued)

FOREIGN PATENT DOCUMENTS

GB    810 289    3/1959

(Continued)

*Primary Examiner*—Greg Binda
*Assistant Examiner*—Clifford J Louden
(74) *Attorney, Agent, or Firm*—Rader, Fishman & Grauer, PLLC

(57) ABSTRACT

A constant velocity fixed joint having an outer joint part (12) with outer ball tracks ($22_1$, $22_2$), an inner joint part (13) with inner ball tracks ($23_1$, $23_2$), the outer ball tracks and the inner ball tracks forming pairs of tracks ($21_1$, $23_1$; $22_2$, $23_2$), the pairs of tracks each accommodate a torque transmitting ball ($14_1$, $14_2$). Each two adjoining pairs of tracks comprise outer ball tracks with center lines in planes extending substantially parallel relative to one another, as well as inner ball tracks with center lines in planes extending substantially parallel relative to one another. An annular ball cage (16) is positioned between the outer joint part (12) and the inner joint part (13). In an aligned joint, centers of the balls are held by the ball cage in the joint center plane and when the joint is articulated, they are guided onto the angle-bisecting plane between the longitudinal axes. The track cross-sections of the outer ball tracks and of the inner ball tracks of each pair of tracks are symmetrical relative to the axes of symmetry which, together with the planes, form identically sized angles opening in opposite directions, and each comprise a common point.

22 Claims, 9 Drawing Sheets

U.S. PATENT DOCUMENTS

| | | | |
|---|---|---|---|
| 5,685,777 A | 11/1997 | Schwarzler | |
| 6,071,195 A * | 6/2000 | Krude | 464/145 |
| 6,270,419 B1 * | 8/2001 | Jacob | 464/145 |
| 7,025,683 B2 | 4/2006 | Schwarzler | |
| 2001/0021671 A1 * | 9/2001 | Ouchi et al. | 464/145 |
| 2003/0017877 A1 * | 1/2003 | Kobayashi et al. | 464/145 |
| 2003/0054893 A1 * | 3/2003 | Thomas | 464/145 |
| 2004/0254021 A1 | 12/2004 | Schwarzler | |

FOREIGN PATENT DOCUMENTS

| | | |
|---|---|---|
| WO | WO 02/08624 A1 | 1/2002 |

* cited by examiner

US 7,591,730 B2

FIXED BALL JOINT WITH TURNED TRACK CROSS-SECTIONS

TECHNICAL FIELD

The invention relates to constant velocity joints in the form of fixed joints having an outer joint part with a longitudinal axis L12 as well as an attaching end and an aperture end positioned axially opposite one another, and which is provided with outer ball tracks; an inner joint part with a longitudinal axis L13 and an attachment for a shaft pointing towards the aperture end of the outer joint part, and inner ball tracks; the outer ball tracks and the inner ball tracks form pairs of tracks; the pairs of tracks each accommodate a torque transmitting ball. Each two adjoining pairs of tracks have outer ball tracks whose centre center lines are positioned in planes E1, E2 which extend substantially parallel relative to one another, as well as inner ball tracks whose center lines are positioned in planes E1', E2' which extend substantially parallel relative to one another. An annular ball cage is positioned between the outer joint part and the inner joint part with circumferentially distributed cage windows which each accommodate the torque transmitting balls of two of said adjoining pairs of tracks. In an aligned joint, the centers $K_1$, $K_2$ of the balls are held by the ball cage in the joint center plane EM and when the joint is articulated, they are guided onto the angle-bisecting plane between the longitudinal axes L12, L13.

BACKGROUND

Joints of this type are known from U.S. Pat. No. 5,685,777, for example. In these joints, torque can be transmitted in the torque direction by half the balls only.

Joints of a similar type are known from U.S. Pat. No. 7,025,683 wherein the cross-section of the outer ball tracks and of the inner ball tracks is defined by circular arches, with the respective axis of symmetry of the ball track cross-sections being positioned in those planes which contain the track center lines. Under torque conditions, depending on the torque transmitting direction, this leads to disadvantageous load conditions at the track edges.

SUMMARY OF THE INVENTION

The present invention provides joints of said type which, under torque load, comprise the most advantageous load conditions independently of the torque transmitting direction.

This is achieved by providing joints of said type wherein the track cross-sections of the outer ball tracks and of the inner ball tracks of each pair of tracks are symmetrical relative to axes of symmetry $ES_1$, $ES_2$ which, together with the planes E1, E2, E1', E2', form identically sized angles $\phi_1$, $\phi_2$ opening in opposite directions and each comprise a common point M, M'. The angles $\phi_1$, $\phi_2$ range from 0.8 to $1.3\phi_0$, wherein $2\phi_0$ constitutes the center angle in an aligned joint between radial rays RS1, RS2 from the longitudinal axes L12, L13 through the ball centers K1, K2 of the balls of two of said adjoining pairs of tracks. The significance of this measure can be explained as follows: If $\phi_1$, $\phi_2$ equal $\phi_0$, then the track cross-sections of the outer ball tracks and of the inner ball tracks of each pair of tracks are symmetrical relative to radial rays RS1, R82 from the longitudinal axes through the ball centers K1, K2 of the torque transmitting balls of the pair of tracks. If $\phi_1$, $\phi_2$ are not equal to $\phi_0$, then the track cross-sections of the outer ball tracks and of the inner ball tracks of each pair of tracks are symmetrical relative to the straight lines $PS_1$, $PS_2$ which are positioned in the cross-sectional plane, which are parallel to the radial rays RS1, RS2 and which intersect one another in a common point M' at a distance from the longitudinal axes L12, L13.

Therefore, in fixed joints whose balls are guided in ball tracks extending in pairs in substantially parallel planes E1, E2, E1', E2'—wherein, in order to increase the load bearing capacity, two balls each are received in a cage window—it is ensured that the introduction of force into the ball tracks is improved and guarantees substantially uniform conditions independently of the torque transmitting direction. This is achieved by the symmetric design of the track cross-sections of each pair of tracks relative to the radial rays RS1, RS2 from the longitudinal axis L12, L13 through the ball centers K1, K2 and relative to the straight lines PS1, PS2 which extend parallel to such radial rays. Slight deviations from the strict symmetry relative to the individual radial rays RS1, RS2 are permissible and possibly advantageous, more particularly in those cases where the ball tracks are produced with tools whose movements are to take place on defined planes, with the tool axes preferably being kept parallel relative to one another.

According to a first basic embodiment, the track center lines M22 of the outer ball tracks and the track center lines M23 of the inner ball tracks are positioned in planes E1, E2 which extend parallel relative to one another and parallel to the longitudinal axes L12, L13 of the joint and extend through the ball centers of the balls of two of said adjoining pairs of tracks.

The joint can be provided in the form of a twin ball joint, wherein the opening angles $\alpha_1$, $\alpha_2$ between the tangents at the base lines of two of said adjoining pairs of tracks in an aligned joint in the joint center plane EM, in each case, open in the same direction, more particularly towards the attaching end of the outer joint part.

According to a second basic embodiment, the joint can be provided in the form of a counter track joint, wherein the opening angles $\alpha_1$, $\alpha_2$ between the tangents at the base lines of two of said adjoining pairs of tracks in an aligned joint in the joint center plane EM open in opposite directions. More particularly, the balls of two of said adjoining pairs of tracks in an aligned joint can be positioned on different pitch circle radii.

According to a further basic alternative embodiment the track center lines $M22_1$, $M22_2$ of the outer ball tracks extend in planes E1, E2 which extend parallel relative to one another and through the ball centres centers of the balls of two of said adjoining pairs of tracks and which comprise identical perpendicular distances from the joint center M, while forming intersection angles $\gamma_0$ with parallel lines relative to the longitudinal axes L12, L13 and that track center lines $M23_1$, $M23_2$ of the outer ball tracks extend in planes E1', E2' which extend parallel relative to one another and through the ball centers of the balls of two of said adjoining pairs of tracks and which comprise identical perpendicular distances from the joint center M, while forming intersection angles $\gamma_0'$ with parallel lines relative to the longitudinal axes L12, L13. The angles $\gamma_0$ and $\gamma_0'$ are identical in size and open in opposite directions, so that there is obtained an intersection angle angles $\gamma_0+\gamma_0'$ between the planes E1, E2 of the outer tracks and the planes E1', E2' of the inner tracks.

In contrast to the initially mentioned embodiment wherein the spatial control angle at the balls changes slightly as a function of the direction of the introduction of torque, it is possible with the above embodiment to compensate for the dependence of the spatial control angles $\epsilon_0$, $\epsilon_0'$ at the balls on the torque transmitting direction. More particularly, the intersection angles $\gamma_0, \gamma_0'$ can be selected to be such that the spatial control angles of the ball tracks are identical in size both in the case of a torque $Kr_0$ rotating clockwise or a torque $Kl_0$ rotating anti-clockwise.

Furthermore, with a center angle $2\phi_0$ between the radial rays RS1, RS2 through the ball centers of the balls of two of said adjoining pairs of tracks, the angle of intersection $\gamma_0$ is calculated in accordance with the equation $\gamma_0 = \epsilon_0 \times \tan \phi_0$ to ensure that the spatial control angles are identical in size regardless of whether the load on the joint rotates to clockwise or anticlockwise.

If the track center lines are positioned in the axis-parallel planes E1, E2, there are obtained different spatial control angles for clockwise and anti-clockwise torque rotations, which is due to the fact that the contact angles $\delta$ for torque loads rotating clockwise and anti-clockwise are symmetrical relative to the radial ray RS. The spatial control angles for loads rotating clockwise and anti-clockwise are:

$$Kr_0 = \epsilon_0 \times \cos(\delta + \phi)$$

$$Kl_0 = \epsilon_0 \times \cos(\delta - \phi_0)$$

Because of the $+/-\phi_0$ influence, they are clearly different.

By rotating the planes E1, E2 around a normal axis around the intersection angle $\gamma_0$, it is possible to ensure that spatial control angles $Kr_0$, $Kl_0$ become identical. This is the case for the condition $\gamma_0 = \epsilon_0 \times \tan \phi_0$.

According to a first embodiment of the track cross-sections, it is proposed that the cross-sections of the outer ball tracks and of the inner ball tracks are formed by parabolic or elliptical portions or by pointed arches (Gothic arches), which each generate contact with the balls in two points.

According to a second embodiment of the track cross-sections it is proposed that the track cross-sections of the outer ball tracks and of the inner ball tracks are formed by circular portions whose centers of curvature are positioned at a distance from one another on the respective radial ray RS1, RS2 and, respectively, on the straight lines PS1, PS2 extending parallel thereto and whose radius of curvature is greater than the ball radius and which generate contact with the balls in one point only which, in a torque-free condition, is positioned in the track base.

DETAILED DESCRIPTION

Figure 1A:
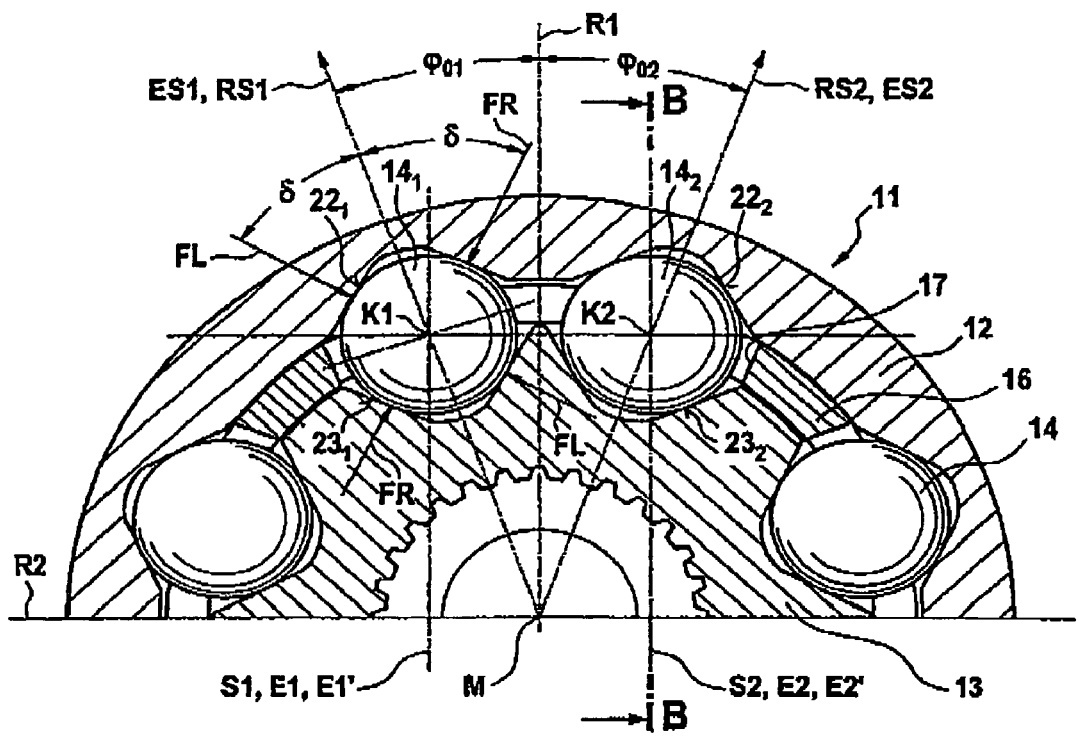
FIG. 1 shows an inventive joint having the characteristics in accordance with the invention:
 A) in half a cross-section according to sectional line C-C of FIG. 1B; and
 B) in an offset longitudinal section according to sectional line B-B of FIG. 1A.

The two illustrations of FIG. 1 will be described jointly below. FIG. 1 shows a constant velocity fixed joint 11 which comprises an outer joint part 12, an inner joint part 13, torque transmitting balls 14 and a ball cage 16. Two balls $14_1$, $14_2$ each are accommodated in a common cage window 17 of the ball cage. The balls are held in outer ball tracks $22_1$, $22_2$ and inner ball tracks $23_1$, $23_2$, wherein the ball tracks of adjoining balls $14_1$, $14_2$ form pairs of tracks $22_1$, $23_1$, $22_2$, $23_2$. RS1 and RS2 refer to radial rays from the longitudinal axes L12, L13 through the centers K1, K2 of the balls $14_1$, $14_2$. S1 and S2 refer to the sectional lines of planes E1, E2, E1', E2' in which there are positioned the center lines of the ball tracks, with the sectional plane C-C which approximately can be regarded as the cross-sectional plane through the joint. In these planes E1, E2, E1', E2' there are positioned the center lines of the ball tracks. These can be provided in the form of planes extending parallel to the longitudinal axes L12, L13 or as planes which form an angle of intersection with the longitudinal axes L12, L13 and are parallel to one another in pairs. The ball tracks extend symmetrically relative to axes of symmetry ES1, ES2 which, together with the radial planes R1, R2, form identically sized angles $\phi_{01}$, $\phi_{02}$ opening in opposite directions and which, in the present case, correspond to the radial rays RS1, RS2.

$\phi_{01}$, $\phi_{02}$ is given as half the center angle between the radial rays RS1, RS2 through the centers of the balls $14_1$, $14_2$ with reference to the longitudinal axes L12, L13 and, respectively, half the opening angle between the two radial rays RS1, RS2.

The design of the ball tracks is not given in greater detail, but it should be such that, if the torque or the inner joint part rotates clockwise, the pair of forces FR acts at an angle $\delta$ with reference to the radial ray RS on the ball, and if the torque on the inner joint part rotates anticlockwise, the pair of forces FL acts on the ball at the same angle $\delta$ with reference to the radial ray RS. The points of impact of the forces FR, FL represent the contact points of the ball tracks with the ball under torque.

Figure 1B:
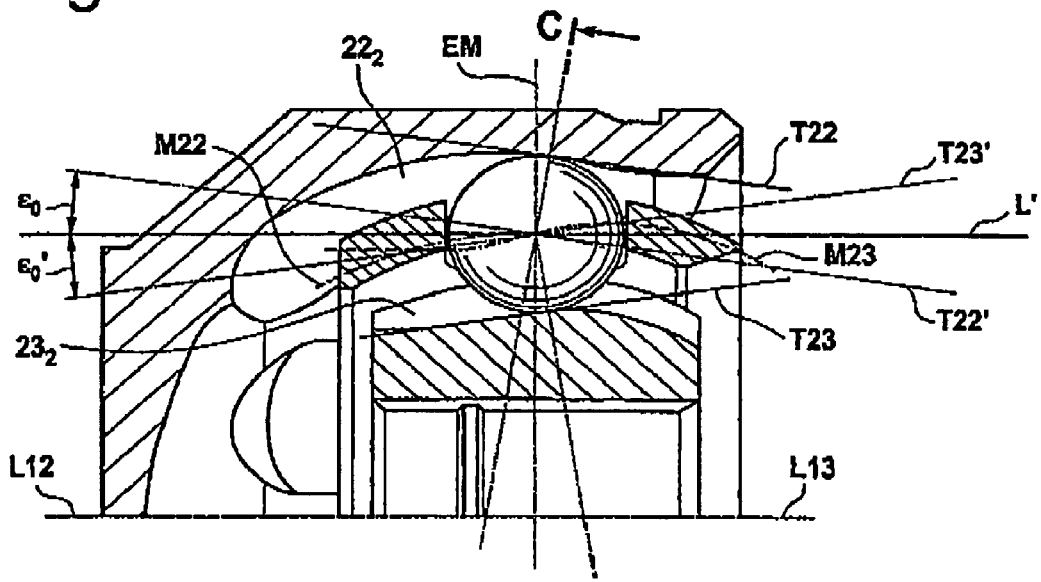

FIG. 1B, in addition, shows the ball tracks $22_2$, $22_3$ with the track center lines M22, M23, as well as the tangents T22, T23 at the ball track base lines in the plane C-C. Tangents T22', T23' at the track center lines M22, M23 extend parallel to said tangents T22, T23 at the track base lines and are positioned in planes which, according to the above, can be positioned parallel to the longitudinal axes L12, L13 or at an angle relative to the longitudinal axes L12, L13.

The tangents T22', T23' at the track center lines M22, M23 form track angles $\epsilon_0$ with a parallel line L' extending parallel to the longitudinal axes L12, L13, wherein, in the first case, said tangents T22', T23' forming said track angles which are positioned in the drawing plane and, in a special case, are inclined at the angles $\phi_0$, $\phi_0'$ relative to the illustration plane.

Figure 2B:
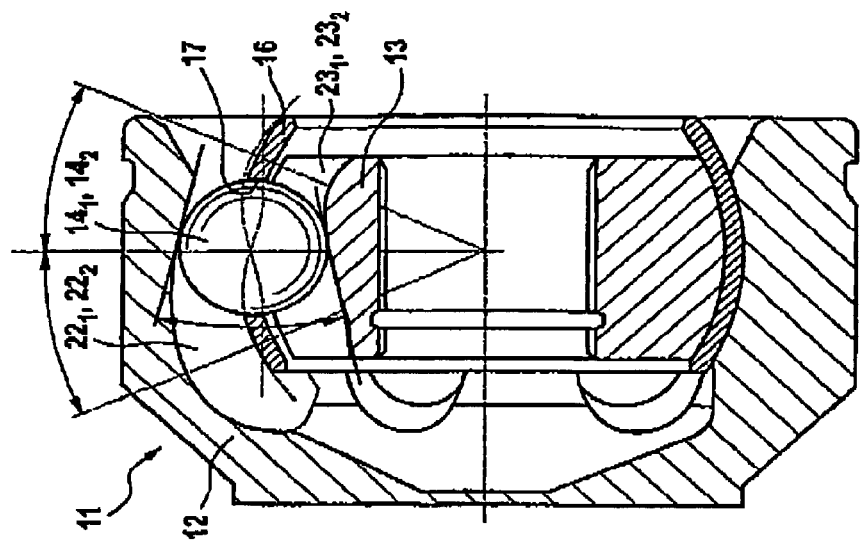
FIG. 2 shows an inventive joint in the form of a twin ball joint:
 A) in an axial view; and
 B) in a longitudinal section along the sectional planes A-A, B-B of FIG. 2A.
Figure 2A:
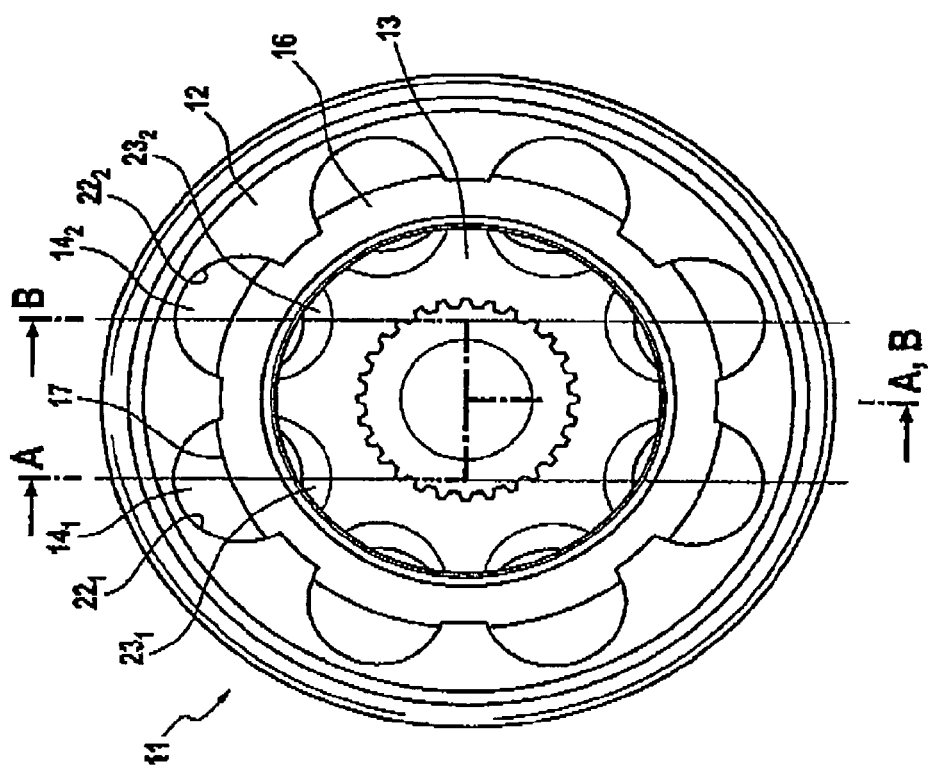

FIGS. 2A and 2B will be described jointly below. They show an inventive joint in the form of a twin ball joint, with identical details having been given the same reference numbers as in FIG. 1. To that extent reference is made to the description of same. It can be seen that the ball tracks 22$_1$, 23$_1$ and 222, 23$_2$ of two adjoining balls 14$_1$, 14$_2$ held in a common cage window 17 are designed so as to correspond to one another according to sectional planes A-A and B-B. The identifiable corresponding track extensions apply to all ball tracks of the joint. Joints of this type are referred to by the applicant as twin ball joints. In the scale shown, the details of the track cross-sections cannot be identified.

The individual illustrations of FIG. 3 will be described jointly below. They show an inventive joint in the form of a counter track joint. Identical details have been given the same reference numbers as in FIG. 1, and modified features have been indexed by 300. To that extent, reference is made to the description of same. As can be seen with reference to the individual sections, the ball tracks 22$_1$, 23$_1$ of first balls 14$_1$ which, together with second balls 14$_2$, are held in a common cage window 17 comprise a first opening angle $\alpha_1$ relative to the joint aperture and the second ball tracks 22$_2$, 23$_2$ of said second balls 14$_2$ which, together with the first balls 14$_1$, are held in a common cage window, comprise a second opening angle $\alpha_2$ which opens towards the joint base.

The conditions shown here for the ball tracks of a pair of tracks apply accordingly to all pairs of tracks of two adjoining balls which are held in a common cage window. The first and second pairs of tracks alternate around the circumference. Joints of the type described here are referred to by the applicant as counter track joints.

Figure 4A:
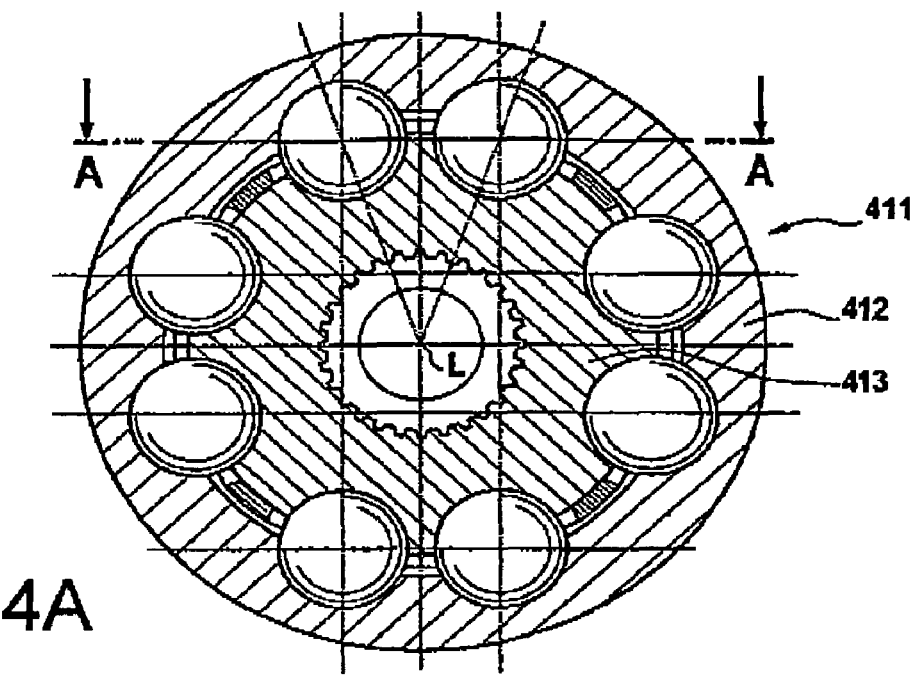
FIG. 4 shows an inventive joint in the form of counter track joint in an alternative embodiment:
 A) in a cross-section through the center plane EM; and
 B) in a longitudinal section according to the sectional line A-A of FIG. 4A.
Figure 4B:
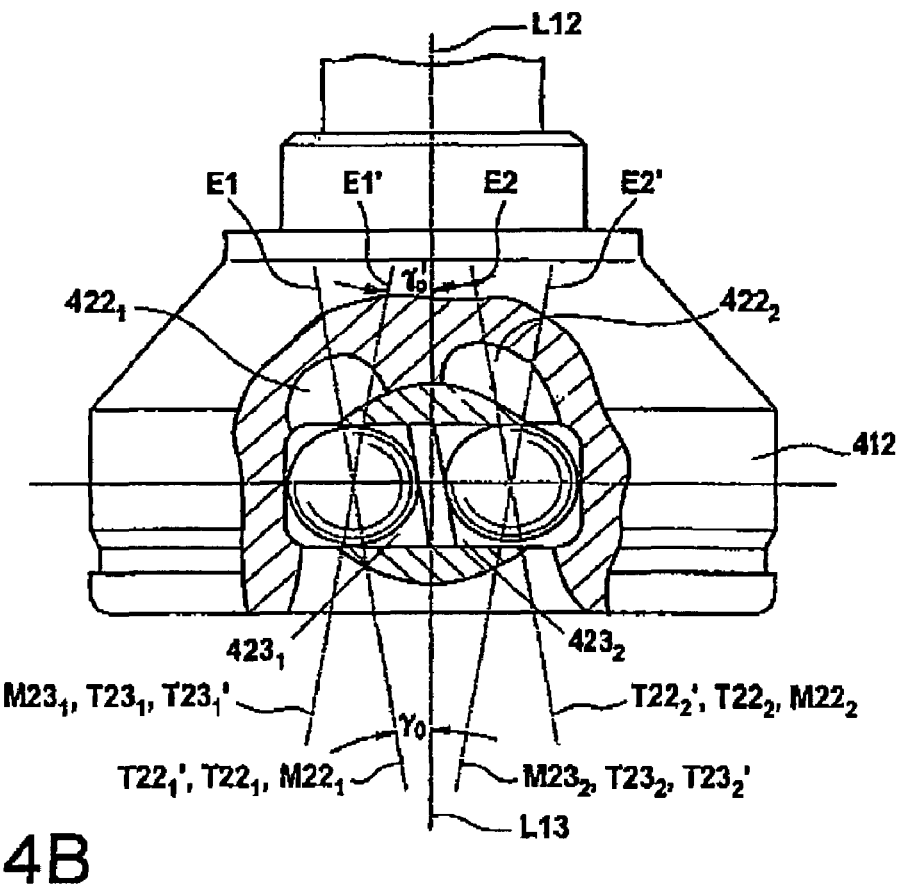

The illustrations of FIG. 4 will be described jointly below. As regards the details shown in FIG. 4, reference is made to the description of FIG. 1, with the same features given the same reference numerals, and modified features indexed by 400. FIG. 4A shows a sectional line A-A which extends through two ball centers K1, K2 of the balls 14$_1$, 14$_2$ of two adjoining pairs of tracks and parallel to the longitudinal axes L12, L13. FIG. 4B shows that the center lines M22 of the outer ball tracks 422$_1$, 422$_2$ are positioned in planes E1, E2 which, together with the longitudinal axis L12, form an angle $\gamma_0$, whereas the center lines M23 of the inner ball tracks 423$_1$, 423$_2$ are positioned in planes which extend parallel relative to one another and which, together with the longitudinal axis L13, form an identically sized angle $\gamma_0'$ opening in the opposite direction.

Figure 5:
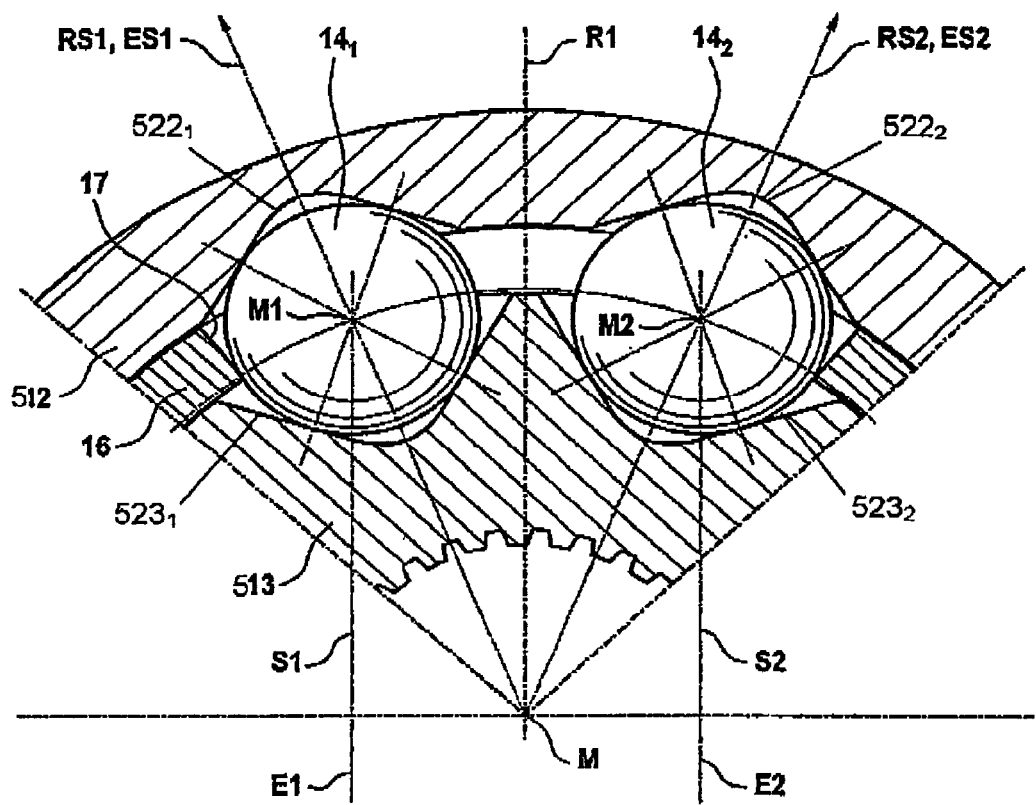
FIG. 5 shows a partial cross-section through an inventive joint in a first embodiment of the ball track cross-section according to sectional line C-C in FIG. 1B.

FIG. 5, in a cross-sectional view, shows two adjoining pairs of tracks 522$_1$, 523$_1$; 522$_2$, 523$_2$ of two balls 14$_1$, 14$_2$ held in one cage window 17. The cross-sectional shape of the ball tracks is symmetrical relative to the radial rays RS1, RS2 which are identical to the axes of symmetry ES1, ES2 of the track cross-section. The ball center lines are positioned in the panes E1 and E2 which extend parallel to the radial planes R1. The cross-sectional shape of each ball track can be parabolic or Gothic (composed of two circular arches with offset centers), with two-point contact occurring in each of the ball tracks. Irrespective of the position of the articulated joint, there is ensured an advantageous force application angle of the previously mentioned pairs of force FR, which force application angle does not substantially change during the articulation of the joint, so that the balls cannot move towards the track edges.

Figure 6:
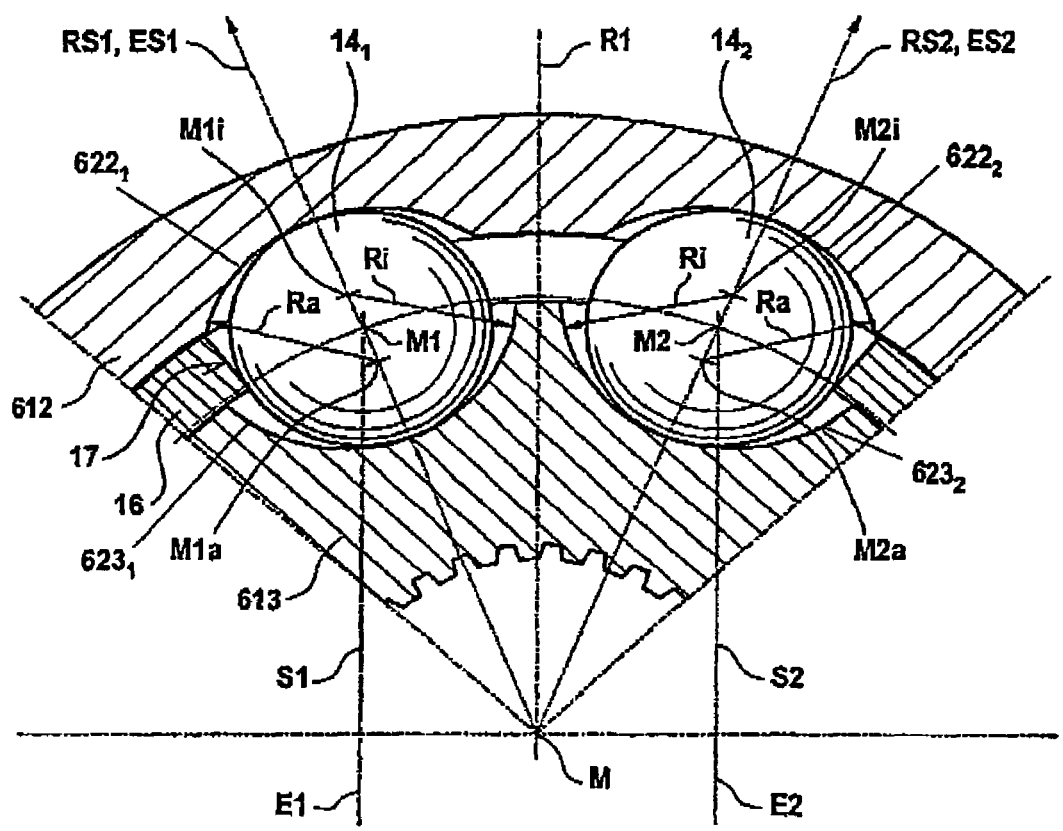
FIG. 6 shows a partial cross-section through an inventive joint in a second embodiment of the ball track cross-section according to sectional line C-C of FIG. 1B.

FIG. 6, in a cross-sectional view, shows two adjoining pairs of tracks 622$_1$, 623$_1$; 622$_2$, 623$_2$ of two balls 14$_1$, 14$_2$ held in one cage window 17. In this case, too, the ball tracks of the pairs of tracks 622$_1$, 623$_1$; 622$_2$, 623$_2$ are symmetrical relative to the radial rays RS1, RS2 which are identical to the axes of symmetry ES1, ES2 of the track cross-sections. The ball track center lines are positioned in the planes E1, E2 which extend parallel to the radial planes R1. The cross-sections of the ball tracks of each pair of tracks are formed by circular arches whose centers M1a, M1i; M2a, M2i are positioned on the respective radial ray RS1, RS2, with the radii Ra, Ri being clearly greater than the ball radius. Torque-free conditions thus result in contact between the balls 14$_1$, 14$_2$ and the ball tracks 622$_1$, 623$_1$; 622$_2$, 623$_2$ in the respective track base.

The illustrations of FIG. 7 will be described jointly below. Identical details have been given the same reference numbers as in FIG. 1, and modified features have been indexed by 700. To that extent, reference is made to the preceding description.

Figure 7A:
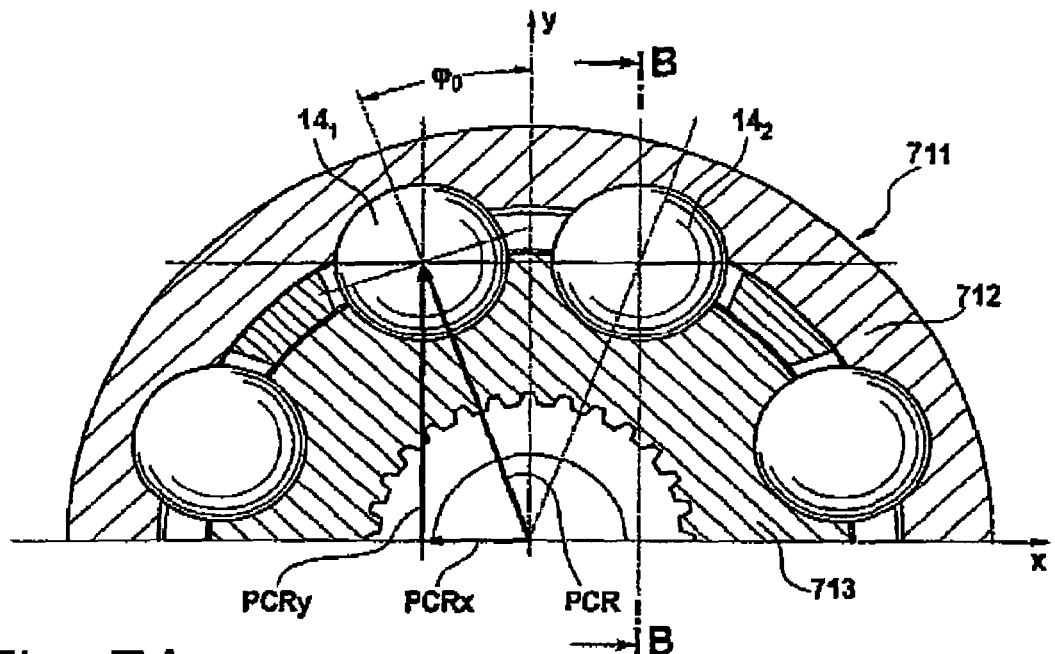
FIG. 7 shows the joint according to FIG. 1 in a modified embodiment:
 A) in half a cross-section according to sectional line C-C of FIG. 7B; and
 B) in an offset longitudinal section according to sectional line B-B of FIG. 7A.

In FIG. 7A the pitch circle radius PCR is split in accordance with its two components of PCRx and PCRy with reference to the x-axis perpendicularly relative to the sectional plane B-B and to the y-axis parallel to the sectional plane B-B.

Figure 7B:
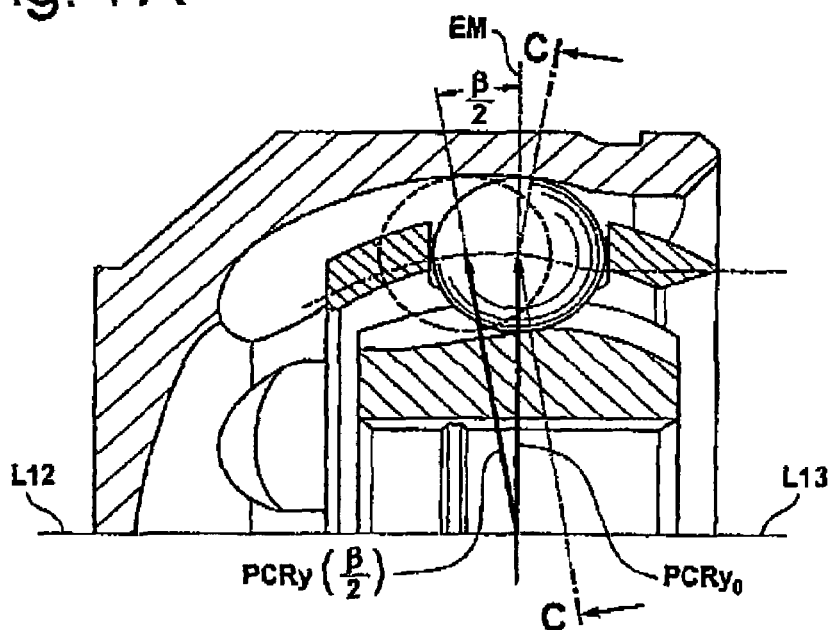
Figure 8:
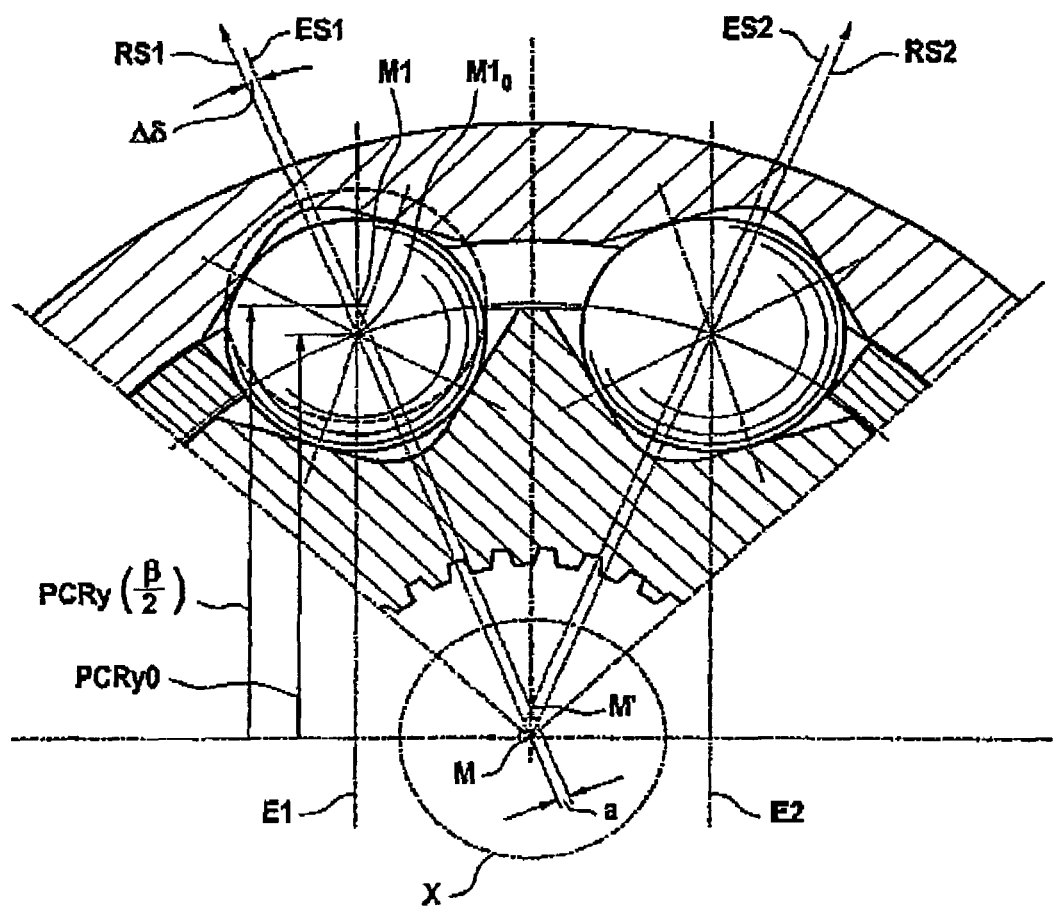
FIG. 8 shows a partial cross-section through an inventive joint with reference to FIG. 7.

FIG. 7B shows the movement of the ball 14$_2$ when the inner joint part 713 is articulated relative to the outer joint part 712 towards the left by an angle $\beta$, with the ball, with reference to the center M, having been displaced by an angle $\beta/2$ relative to the outer joint part. There are also shown the pitch circle radii PCRy(0) in an aligned joint and PCRy($\beta/2$) in a joint articulated by the angle $\beta$. Because of the way in which the track extends, PCRy($\beta/2$) is greater than PCRy(0).

Thus, for the non-articulated joint, the following is obtained:

$$PCR_0 = \sqrt{(PCRx_0^2 + PCRy_0^2)}$$

and a pitch angle $\phi_0$, with the pitch angle $\phi$ being calculated from $$\tan \phi_0 = PCRx_0/PCRy_0$$

and for the articulated joint accordingly $$PCR = \sqrt{(PCRx^2 + PCRy^2)}$$

and a pitch angle $\phi$, with the pitch angle $\phi$ being calculated from $$\tan \phi = PCRx/PCRy.$$

As PCR and $\phi$ change only slightly along the ball tracks, even tracks which are produced with a constant angle $\phi_x$ relative to the longitudinal planes through the radial rays R1 feature the advantageous introduction of force into the ball tracks as proposed by the invention.

Depending on the rotational position of the joint 711 as a function of the angle of articulation, the ball is in different positions along the ball track. On condition that the ball tracks are positioned in planes extending parallel relative to one another and parallel to the longitudinal axis L12, L13, PCRx remains unchanged, whereas PCRy can vary. As a result, there occurs a slight change in the angle $\phi$ between the center plane through the longitudinal axes L12, L13 and the through the y-axis, and the radial ray RS from the joint center M through the ball center K.

In order to accurately maintain the inventive symmetry of the ball tracks, the centers of curvature M1i and M1a and M21 and M2a respectively have to be positioned in planes formed by the radial rays RS1, RS2 and the longitudinal axes L12, L13.

Therefore, in accordance with the embodiment shown here, the centers M1i and M1a are each positioned in a plane which extends parallel to those planes which contain the track center lines. This means that the effective line (axis of symmetry of the track cross-section) will no longer, in every position, extend accurately through the joint center M, but through a center M'. The deviation a between the two planes is relatively small. It is calculated as follows:

$$a = (PCRy(\beta) - PCRy(0)) \times \sin \phi_0,$$

and the deviation of the plane of symmetry of the ball track cross-section towards the radial ray amounts to $$\Delta\delta \approx a/PCR \text{ [rad.]}.$$

In FIG. 5, any details identical to those shown in FIG. 4 have been given the same reference numbers, and the effect of the ball movement on the ball $14_1$ when the joint is articulated as illustrated in FIG. 7A has been taken over. Whereas the center lines of the ball tracks always extend in the planes E1, E2, there occurs a displacement of the planes of symmetry of those track cross-sections which are no longer defined by the second radial rays RS1, RS2 intersecting one another in the joint center M, but by the axes of symmetry $ES_1$, $ES_2$ intersecting one another in the point M' in the radial plane R1. The track center $M1_0$ is displaced in the plane E1 into the track center M1. A radial ray from the joint center M and, respectively from the longitudinal axis through the track center deviates from the radial ray RS1 by the angle $\Delta\delta$. The distance between the centers M, M' and $M1_0$, $M1$ is given as $\Delta PCRy$.

Figure 3A:
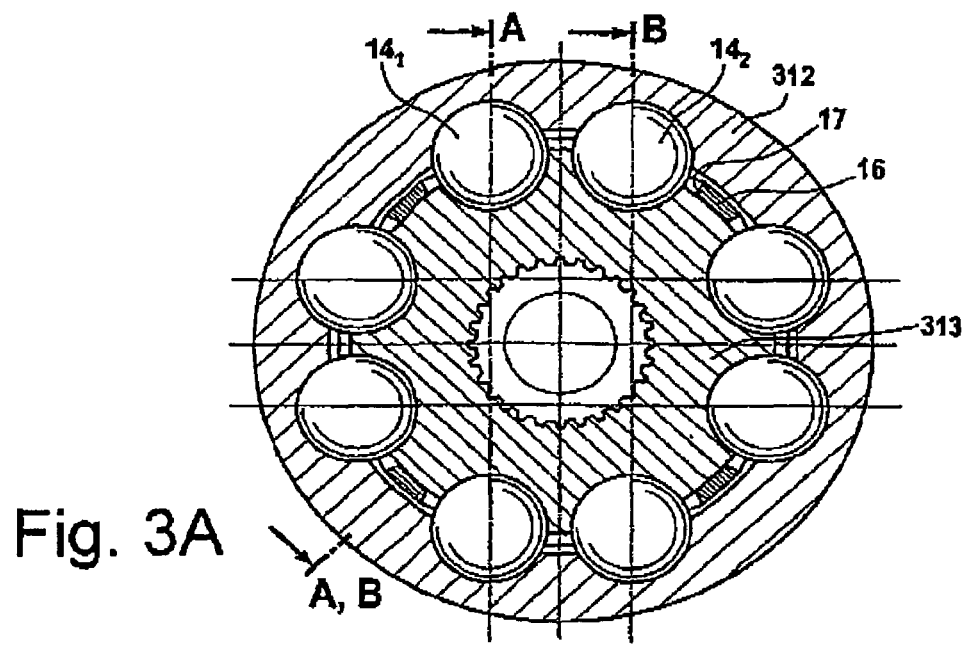
FIG. 3 shows an inventive joint in the form of a counter track joint:
 A) in a cross-section through the center plane EM;
 B) in a longitudinal section according to the sectional plane A-A in FIG. 3A; and
 C) in a cross-section according to sectional plane B-B in FIG. 3A.
Figures 3B, 3C:
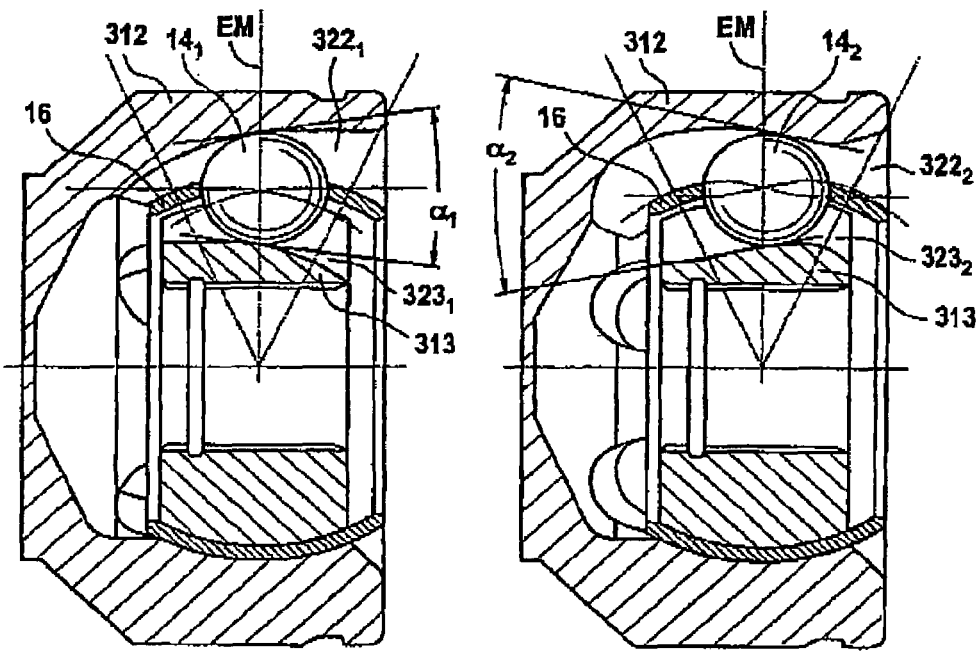
Figure 9:
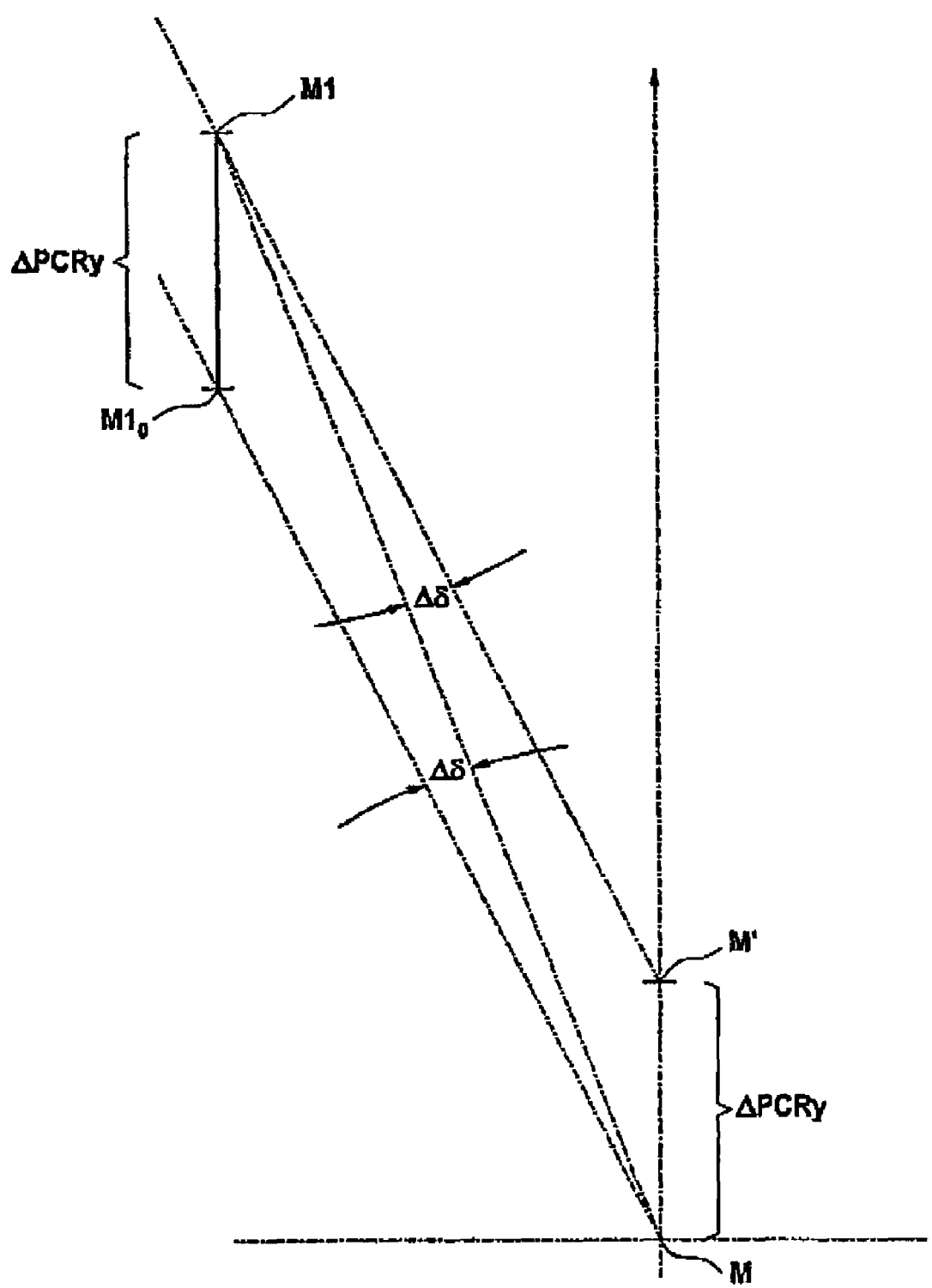
FIG. 9 shows angle conditional according to the joint according to FIG. 8 in an illustration with vertical exaggeration.

FIG. 9 gives the angle conditions of FIG. 3 in the form of an enlarged detail.

The invention claimed is:

1. A constant velocity fixed joint comprising;
an outer joint part having a longitudinal axis (L12), and an attaching end and an aperture end positioned axially opposite one another, and outer ball tracks;
an inner joint part having a longitudinal axis (L13), an attaching mechanism for a shaft pointing towards the aperture end of the outer joint part, and inner ball tracks, the outer ball tracks and the inner ball tracks form pairs of tracks which each accommodate a torque transmitting ball, wherein each two adjoining pairs of tracks comprise outer ball tracks whose center lines are positioned in planes (E1, E2) which extend substantially parallel relative to one another, and inner ball tracks whose center lines are positioned in planes (E1', E2') which extend substantially parallel relative to one another; and
an annular ball cage between the outer joint part and the inner joint part and comprising circumferentially distributed cage windows which each accommodate the torque transmitting balls of two of said adjoining pairs of tracks;
wherein, in an aligned joint, centers ($K_1$, $K_2$) of the balls are held by the ball cage in the joint center plane (EM) and, when the joint is articulated, the ball centers are guided onto the angle-bisecting plane between the longitudinal axes (L12, L13);
wherein track cross-sections of the outer ball tracks and the inner ball tracks of each pair of tracks are symmetrical relative to axes of symmetry ($ES_1$, $ES_2$) which, together with the outer and inner ball track planes (E1, E2, E1', E2'), form identically sized angles ($\phi_1$, $\phi_2$) opening in opposite directions, and each comprise a common point (M, M'); and
wherein the track cross-sections of the outer ball tracks and the inner ball tracks are formed so as to generate contact with the balls in two points.

2. A joint according to claim 1, wherein the track cross-sections of the outer ball tracks and of the inner ball tracks of each pair of tracks are each symmetrical relative to radial rays (RS1, RS2) from the longitudinal axes (L12, L13) through the ball centers (K1, K2) of the torque transmitting balls of the pair of tracks.

3. A joint according to claim 2, wherein the angles ($\phi_1$, $\phi_2$) range from $0.8\phi_0$ to $1.3\phi_0$, wherein $2\phi_0$ constitutes a center angle in an aligned joint between radial rays from the longitudinal axes through the ball centers (K1, K2) of the balls of two of said adjoining pairs of tracks.

4. A joint according to claim 2, wherein the track center lines of the outer ball tracks and of the inner ball tracks are positioned in planes (E1, E2) which extend parallel relative to one another and parallel relative to the longitudinal axes of the joint and which extend through the ball centers of the balls of two of said adjoining pairs of tracks.

5. A joint according to claim 2, wherein track center lines (M22) of the outer ball tracks extend in first planes (E1, E2) and center lines (M23) of the inner ball tracks extend in second planes (E1', E2') which are parallel relative to one another and extend through the ball centers of the balls of two of said adjoining pairs of tracks and which are at identical perpendicular distances from the joint center (M), and wherein, together with the longitudinal axes, they form identically sized angles of intersection ($Y_0$, $Y_0'$) extending in opposite directions.

6. A joint according to claim 1, wherein the track cross-sections of the outer ball tracks and of the inner ball tracks of each pair of tracks are each symmetrical relative to straight lines ($PS_1$, $PS_2$) which are positioned in a cross-sectional plane and which extend parallel to radial rays (RS1, RS2) from the longitudinal axes (L12, L13) through the ball centers of the torque transmitting balls of the pair of tracks and which intersect one another in a common point (M') at a distance from the longitudinal axes.

7. A joint according to claim 6, wherein the angles ($\phi_1$, $\phi_2$) range from $0.8\phi_0$ to $1.3\phi_0$, wherein $2\phi_0$ constitutes a center angle in an aligned joint between radial rays from the longitudinal axes through the ball centers (K1, K2) of the balls of two of said adjoining pairs of tracks.

8. A joint according to claim 6, wherein the track center lines of the outer ball tracks and of the inner ball tracks are positioned in planes (E1, E2) which extend parallel relative to one another and parallel relative to the longitudinal axes of the joint and which extend through the ball centers of the balls of two of said adjoining pairs of tracks.

9. A joint according to claim 6, wherein track center lines (M22) of the outer ball tracks extend in first planes (E1, E2) and center lines (M23) of the inner ball tracks extend in second planes (E1', E2') which are parallel relative to one another and extend through the ball centers of the balls of two of said adjoining pairs of tracks and which are at identical perpendicular distances from the joint center (M), and wherein, together with the longitudinal axes, they form identically sized angles of intersection ($Y_0$, $Y_0'$) extending in opposite directions.

10. A joint according to claim 1, wherein the angles ($\phi_1$, $\phi_2$) range from $0.8\phi_0$ to $1.3\phi_0$, wherein $2\phi_0$ constitutes a center angle in an aligned joint between radial rays from the longitudinal axes through the ball centers (K1, K2) of the balls of two of said adjoining pairs of tracks.

11. A joint according to claim 10, wherein the track center lines of the outer ball tracks and of the inner ball tracks are positioned in planes (E1, E2) which extend parallel relative to one another and parallel relative to the longitudinal axes of the joint and which extend through the ball centers of the balls of two of said adjoining pairs of tracks.

12. A joint according to claim 10, wherein track center lines (M22) of the outer ball tracks extend in first planes (E1, E2) and center lines (M23) of the inner ball tracks extend in second planes (E1', E2') which are parallel relative to one another and extend through the ball centers of the balls of two of said adjoining pairs of tracks and which are at identical perpendicular distances from the joint center (M), and wherein, together with the longitudinal axes, they form identically sized angles of intersection ($Y_0$, $Y_0'$) extending in opposite directions.

13. A joint according to claim 1, wherein the track center lines of the outer ball tracks and of the inner ball tracks are positioned in planes (E1, E2) which extend parallel relative to one another and parallel relative to the longitudinal axes of the joint and which extend through the ball centers of the balls of two of said adjoining pairs of tracks.

14. A joint according to claim 1, wherein track center lines (M22) of the outer ball tracks extend in first planes (E1, E2) and center lines (M23) of the inner ball tracks extend in second planes (E1', E2') which are parallel relative to one another and extend through the ball centers of the balls of two of said adjoining pairs of tracks and which are at identical perpendicular distances from the joint center (M), and wherein, together with the longitudinal axes, they form identically sized angles of intersection ($Y_0$, $Y_0'$) extending in opposite directions.

15. A joint according to claim 14, wherein the angles of intersection ($Y_0$, $Y_0'$) are selected in such a way that spatial control angles ($\epsilon_0$, $\epsilon_0'$) of the pairs of tracks at the balls have the same value irrespective of whether the load turns clockwise or anti-clockwise.

16. A joint according to claim 15, wherein with a center angle $2\phi_0$ between radial rays (RS1, RS2) through the ball centers of the balls of two of said adjoining pairs of tracks, the angle of intersection ($Y_0$) is calculated in accordance with the equation $Y_0 = \epsilon_0 \times \tan \phi_0$.

17. A joint according to claim 1, wherein an opening angle ($\alpha_1$, $\alpha_1$) between tangents at the base lines of two of said adjoining pairs of tracks in an aligned joint in the joint center plane (EM) each open in the same direction.

18. A joint according to claim 1, wherein an opening angle ($\alpha_1$, $\alpha_1$) between tangents at the track base lines in the joint center plane (EM) of two of said adjoining pairs of tracks in an aligned joint open in opposite directions.

19. A joint according to claim 18, wherein the balls of two of said adjoining pairs of tracks in an aligned joint are positioned on different pitch circle radii (PCR).

20. A joint according to claim 1, wherein the track cross-sections of the outer ball tracks and of the inner ball tracks are formed by one of parabolic, ellipsoidal portions, and by gothic arches which each generate contact with the balls in the two points.

21. A constant velocity fixed joint comprising:

an outer joint part having a longitudinal axis (L12), and an attaching end and an aperture end positioned axially opposite one another, and outer ball tracks;

an inner joint part having a longitudinal axis (L13), an attaching mechanism for a shaft pointing towards the aperture end of the outer joint part, and inner ball tracks, the outer ball tracks and the inner ball tracks form pairs of tracks which each accommodate a torque transmitting ball, wherein each two adjoining pairs of tracks comprise outer ball tracks whose center lines are positioned in planes (E1, E2) which extend substantially parallel relative to one another, and inner ball tracks whose center lines are positioned in planes (E1', E2') which extend substantially parallel relative to one another; and an annular ball cage between the outer joint part and the inner joint part and comprising circumferentially distributed cage windows which each accommodate the torque transmitting balls of two of said adjoining pairs of tracks;

wherein, in an aligned joint, centers ($K_1$, $K_2$) of the balls are held by the ball cage in the joint center plane (EM) and, when the joint is articulated, the ball centers are guided onto the angle-bisecting plane between the longitudinal axes (L12, L13);

wherein track cross-sections of the outer ball tracks and the inner ball tracks of each pair of tracks are symmetrical relative to axes of symmetry ($ES_1$, $ES_2$) which, together with the outer and inner ball track planes (E1, E2, E1', E2'), form identically sized angles ($\phi_1$, $\phi_2$) opening in opposite directions, and each comprise a common point (M, M'); and wherein the track cross-sections of the outer ball tracks and the inner ball tracks are formed so as to generate contact with the balls in one point.

22. A joint according to claim 21, wherein track cross-sections of the outer ball tracks and inner ball tracks are formed by circular portions whose centers of curvature are positioned at a distance from one another on a respective radial ray (RS1, RS2), and wherein their radius of curvature is greater than the ball radius, and which circular portions generate contact with the balls in the one point.

* * * * *

UNITED STATES PATENT AND TRADEMARK OFFICE
CERTIFICATE OF CORRECTION

PATENT NO. : 7,591,730 B2
APPLICATION NO. : 10/568670
DATED : September 22, 2009
INVENTOR(S) : Schwärzler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 709 days.

Signed and Sealed this

Fourteenth Day of December, 2010

David J. Kappos
*Director of the United States Patent and Trademark Office*